(12) United States Patent
Shin et al.

(10) Patent No.: US 7,594,746 B2
(45) Date of Patent: Sep. 29, 2009

(54) BACKLIGHT ASSEMBLY AND DISPLAY DEVICE HAVING THE SAME

(75) Inventors: Jin-Soo Shin, Hwaseong-si (KR); Jeoung-Gwen Lee, Suwon-si (KR); Young-Jae Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/373,368

(22) Filed: Mar. 10, 2006

(65) Prior Publication Data
US 2006/0203519 A1 Sep. 14, 2006

(30) Foreign Application Priority Data
Mar. 10, 2005 (KR) .................. 10-2005-0020129

(51) Int. Cl.
 *F21V 7/04* (2006.01)
(52) U.S. Cl. .................. 362/633; 362/26; 362/27; 362/600; 362/615; 362/617
(58) Field of Classification Search .................. 362/633, 362/26, 27, 600, 606, 615, 617, 632; 349/57–71
See application file for complete search history.

(56) References Cited

U.S. PATENT DOCUMENTS 3,204,284 A * 9/1965 Merriman .................. 16/2.1
6,885,411 B2 * 4/2005 Ogawa et al. .................. 349/58
2003/0223020 A1 * 12/2003 Lee .................. 349/58

FOREIGN PATENT DOCUMENTS

KR 1020030091570 12/2003

OTHER PUBLICATIONS

English Abstract for Publication No. KR 1020030091570.

* cited by examiner

*Primary Examiner*—Sandra L O'Shea
*Assistant Examiner*—Mark Tsidulko
(74) *Attorney, Agent, or Firm*—Haynes and Boone, LLP (57) ABSTRACT

A backlight assembly includes a light source, a light guide plate, and a receiving container having a combination guide part. The coupling guide part is inwardly protruded with respect to the sidewalls of the receiving container. The coupling guide part corresponds with a guide recess on the light guide plate to guide the light guide plate to a proper position. The coupling guide part may also include a screw thread to couple the receiving container with an external case. Therefore, the receiving container may be easily coupled with the external case and the light guide plate may be guided to a proper position via the combination guide part to thereby simplify a manufacturing process of the backlight assembly and reduce its size.

5 Claims, 11 Drawing Sheets

BACKLIGHT ASSEMBLY AND DISPLAY DEVICE HAVING THE SAME

CROSS-REFERENCE TO RELATED APPLICATION

This application claims priority from Korean Patent Application No. 2005-20129 filed on Mar. 10, 2005, the disclosure of which is herein incorporated by reference in its entirety.

BACKGROUND OF THE INVENTION

1. Field of the Invention

The present invention discloses a backlight assembly and a display device including the backlight assembly. In particular, the present invention relates to a backlight assembly capable of simplifying a manufacturing process thereof and reducing the backlight assembly size.

2. Description of the Related Art

A liquid crystal display (LCD) device displays an image by using liquid crystals. The LCD device includes a first substrate, a second substrate and a liquid crystal layer disposed therebetween. When an electric field is applied to the liquid crystal layer, an arrangement of liquid crystal molecules that comprise the liquid crystal layer is altered to change optical transmissivity so that an image is displayed.

An LCD module includes an LCD panel assembly and a backlight assembly. The LCD panel assembly includes an LCD panel and a printed circuit board for driving the LCD panel. The LCD panel includes the first and second substrates and the liquid crystal layer disposed therebetween.

The backlight assembly includes a bottom chassis corresponding to a receiving container, a lamp, a light guide plate, optical members, a mold frame, and a top chassis. The top chassis and the bottom chassis are coupled with each other.

The LCD module includes a user hole. An external case formed by a customer company is coupled with the LCD module through the user hole. The user hole is formed on an external surface of the bottom chassis or a sidewall of the mold frame according to the needs of the customer company. The bottom chassis further includes a guiding member that guides the light guide plate.

Therefore, a width of the LCD module increases due to the user hole. Furthermore, a process of manufacturing the LCD module becomes complex due to the user hole and the guiding member.

SUMMARY OF THE INVENTION

The present invention provides a backlight assembly capable of simplifying a manufacturing process thereof as well as reducing a size of the backlight assembly, and the present invention also provides a display device including such a backlight assembly.

The invention discloses a backlight assembly that includes a light source, a light guide plate that adjusts a path of light from the light source, a receiving container receiving the light guide plate, and a coupling guide part guiding the light plate to a proper position and coupling the receiver container with an external case. The receiving container includes a bottom plate and sidewalls upwardly extending from edge portions of the bottom plate to receive the light guide plate. The coupling guide part is inwardly protruding with respect to the sidewalls of the receiving container.

The invention further discloses a display device that includes a display assembly and a backlight assembly. The display assembly includes a display panel that displays an image by using light. The backlight assembly provides the display panel with the light. The backlight assembly includes a light guide plate that adjusts a path of light from a light source, a receiving container receiving the light guide plate, and a coupling guide part guiding the light plate to a proper position and coupling the receiver container with an external case. The receiving container has a bottom plate and sidewalls upwardly extending from edge portions of the bottom plate. The coupling guide part is inwardly protruding with respect to the sidewalls of the receiving container.

Therefore, the receiving container may be easily coupled with the receiving container and the external case due to the coupling guide part. Furthermore, the light guide plate may be guided to a proper position by the coupling guide part.

BRIEF DESCRIPTION OF THE DRAWINGS

The above and other features and advantages of the present invention will become more apparent by describing in detailed embodiments thereof with reference to the accompanying drawings.

DESCRIPTION OF THE EMBODIMENTS

It should be understood that the embodiments of the present invention described below may be varied modified in many different ways without departing from the inventive principles disclosed herein, and the scope of the present invention is therefore not limited to these embodiments described herein. Rather, these embodiments are provided so that this disclosure will be thorough and complete, and will fully convey the concept of the invention to those skilled in the art by way of illustration and is not meant to be restrictive in nature.

Now, embodiments of the present invention will be described in detail with reference to the accompanying drawings.

Figure 1:
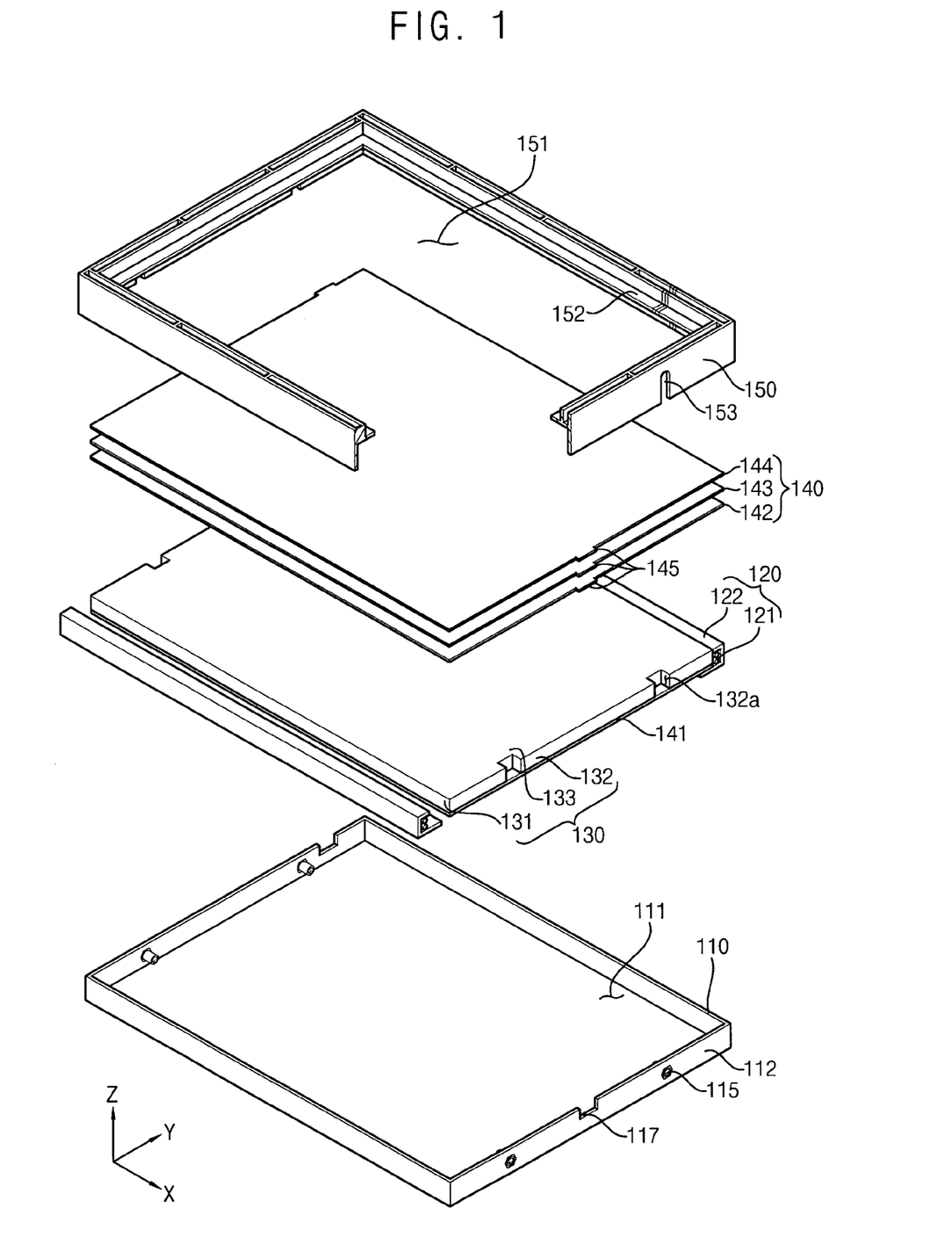
FIG. 1 is an exploded perspective view illustrating a backlight assembly according to an exemplary embodiment of the present invention.

Referring to FIG. 1, a backlight assembly may include a receiving container 110, a lamp unit 120, a light guide plate 130, and a mold frame 150.

Receiving container 110 includes a bottom plate 111 and sidewalls 112. Bottom plate 111 may be plate shaped, and sidewalls 112 extend from edge portions of bottom plate 111. Bottom plate 111 and sidewalls 112 define a receiving space.

Sidewalls 112 include a coupling guide part 115 and a fixing portion 117. Coupling guide part 115 can be inwardly protruding and tube-shaped.

Coupling guide part 115 can be threaded on its inner surface. During assembly process, the coupling guide part 115 is coupled to an external case by using a screw.

Additionally, coupling guide part 115 inwardly protrudes from sidewalls 112 to operate as a guiding member. Coupling guide part 115 is inserted into a guide recess 132a formed at a side face 132 of light guide plate 130 to prevent it from drifting along the y-direction. Coupling guide part 115 may have various shapes such as a circular tube shape or a polygonal tube shape, for example. Here, coupling guide part 115 has a circular tube shape.

Fixing portion 117 receives a protruding portion 145 of optical members 142, 143 and 144 to prevent them from drifting along the y-direction. A pair of fixing portions 117 may be formed at opposing sidewalls 112. Fixing portions 117 are, for example, formed at different positions of sidewalls 112 so that fixing portions 117 may not face each other. Therefore, optical members 142, 143 and 144 are fixed in a correct direction, and prevented from being disposed upside down.

Sidewalls 112 including coupling guide part 115 and fixing portion 117 are not adjacent to a lamp unit 120. In other words, coupling guide part 115 and fixing portion 117 are not disposed at sidewalls that are adjacent to lamp unit 120.

Lamp unit 120 includes a lamp 121 that generates light, and a lamp cover 122 that covers the lamp 121.

Lamp 121 can be disposed at a light incident face 131 of light guide plate 130. Lamp cover 122 covers lamp 121 to reflect light generated from the lamp towards light incident face 131. A lower portion of lamp cover 122 is, for example, extended so that it covers a portion of a lower face of light guide plate 130. Lamp cover 122 includes a light-reflecting layer formed on its inner face.

Light guide plate 130 may include light incident face 131 that is substantially parallel with an x-z plane, a side face 132 that is substantially parallel with a y-z plane, and a light-exiting face 133 that is substantially parallel with an x-y plane. Side face 132 includes the guide recess 132a, which receives coupling guide part 115 to fix light guide plate 130 in a proper position.

An optical unit 140 includes optical members 142, 143 and 144 and a light-reflecting member 141. Light-reflecting member 141 is disposed under light guide plate 130 to reflect back light leaked therefrom.

Optical members 142, 143 and 144 are disposed over the light guide plate 130 to enhance optical properties of light that exits light guide plate 130 through light-exiting face 133. Optical members 142, 143 and 144 may include, for example, a light diffusing sheet and at least one prism sheet.

Mold frame 150 has a rectangular frame shape and includes an opening 151 formed at a center portion thereof. Mold frame 150 also includes a supporting portion 152 formed along its inner edges.

Supporting portion 152 compresses edge portions of optical members 142, 143 and 144 disposed under the mold frame 150, and supports a display panel (not shown) that is to be disposed on top of the mold frame 150. Mold frame 150 may further include a hole 153 corresponding to the portion of coupling guide part 115. Hole 153 is formed at side face of the mold frame 150.

Figure 2:
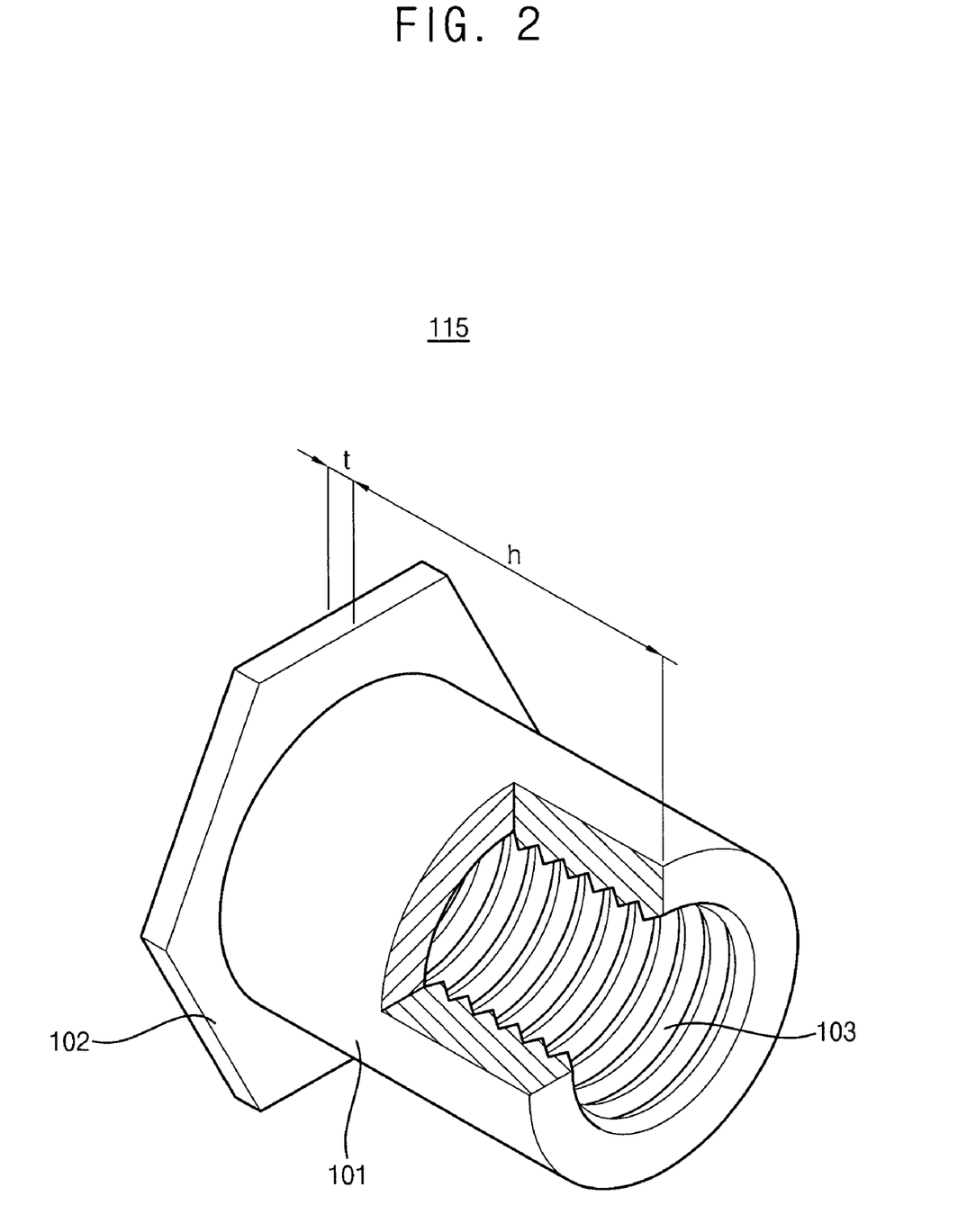
FIG. 2 is a partially cutout perspective view illustrating a coupling guide part in FIG. 1.

Referring to FIG. 1 and FIG. 2, a coupling guide part 115 may include a stud 101 and a fixing end portion 102. Stud 101 has a tube-shape and its inner face includes a screw thread 103. A height 'h' of stud 101 is adjusted according to a depth of guide recess 132a.

Fixing end portion 102 has a polygonal shape. A thickness 't' of the fixing end portion 102 is adjusted according to a thickness of sidewalls 112 of the receiving container 110. Fixing end portion 102 is fixed at sidewalls 112 to fix coupling guide part 115 thereto.

Figure 3:
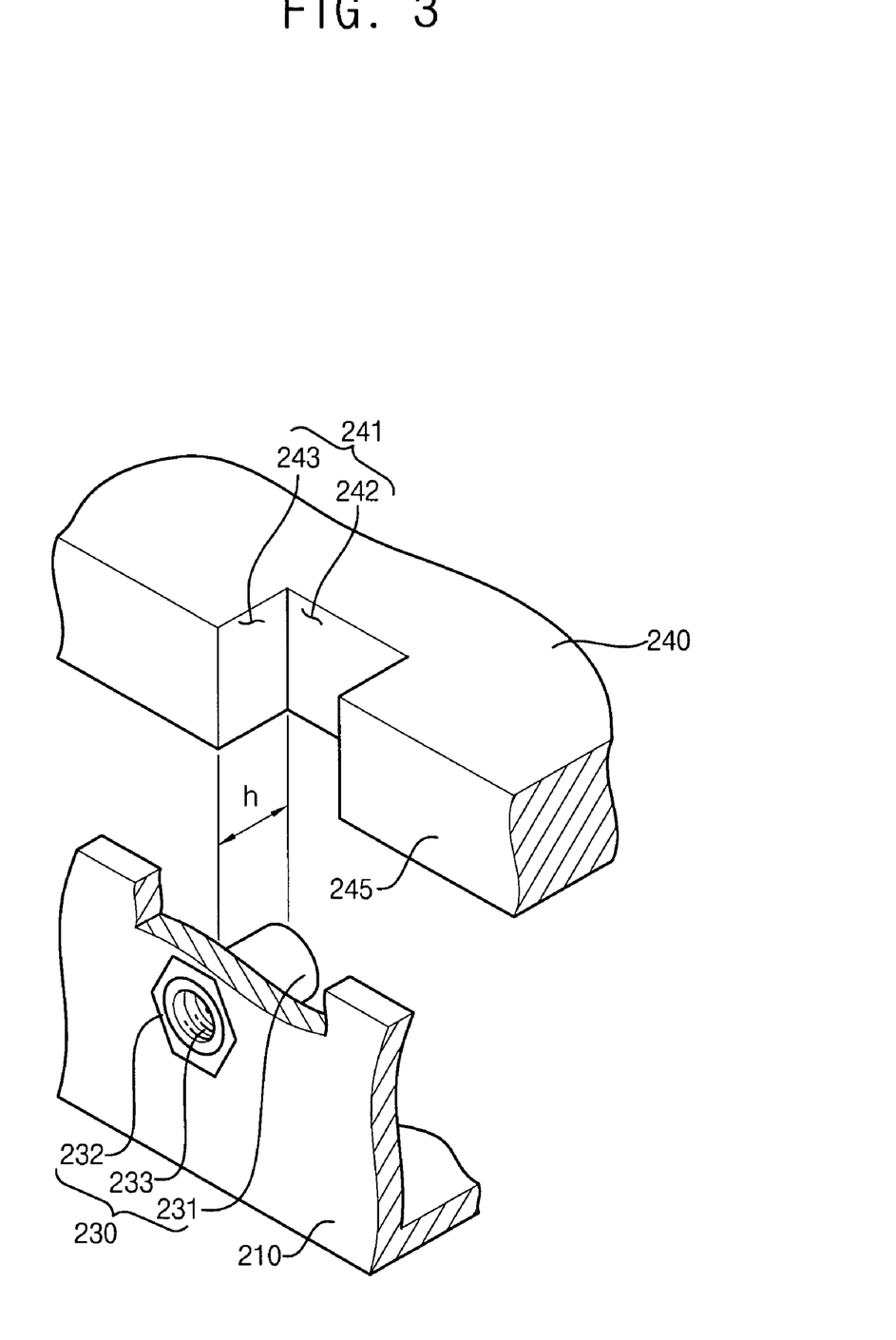
FIG. 3 is a perspective view illustrating a portion of the receiving container and a light guide plate in FIG. 1 according to an embodiment of the present invention.

Looking at FIG. 3, the receiving container may include coupling guide part 230, and light guide plate 240 including a guide recess 241 that corresponds coupling guide part 230.

Coupling guide part 230 is fixed at sidewall 210 of the receiving container (not shown). Coupling guide part 230, which includes inwardly protruding stud 231 and fixing end portion 232, is inserted into guide recess 241. Stud 231 is, for example, a cylindrical shape of a height 'h' and includes a screw thread 233.

Guide recess 241 can be formed at a side face 245 of light guide plate 240. The guide recess 241 has a first face 242 that is substantially parallel with side face 245 and two second faces 243 connecting first face 242 with the side face 245. Each of the second faces 243 has a width 'h' such that a depth of guide recess 241 is substantially same as the height 'h' of the stud 231 of coupling guide part 230.

At least one of the two second faces 243 makes contact with stud 231 when it is inserted into the guide recess 241 to prevent drifting of light guide plate 240.

Coupling guide part 230 helps guide light guide plate 240 to a proper position. Furthermore, a customer's external case may be easily coupled with the LCD module via coupling guide part 230.

Figure 4:
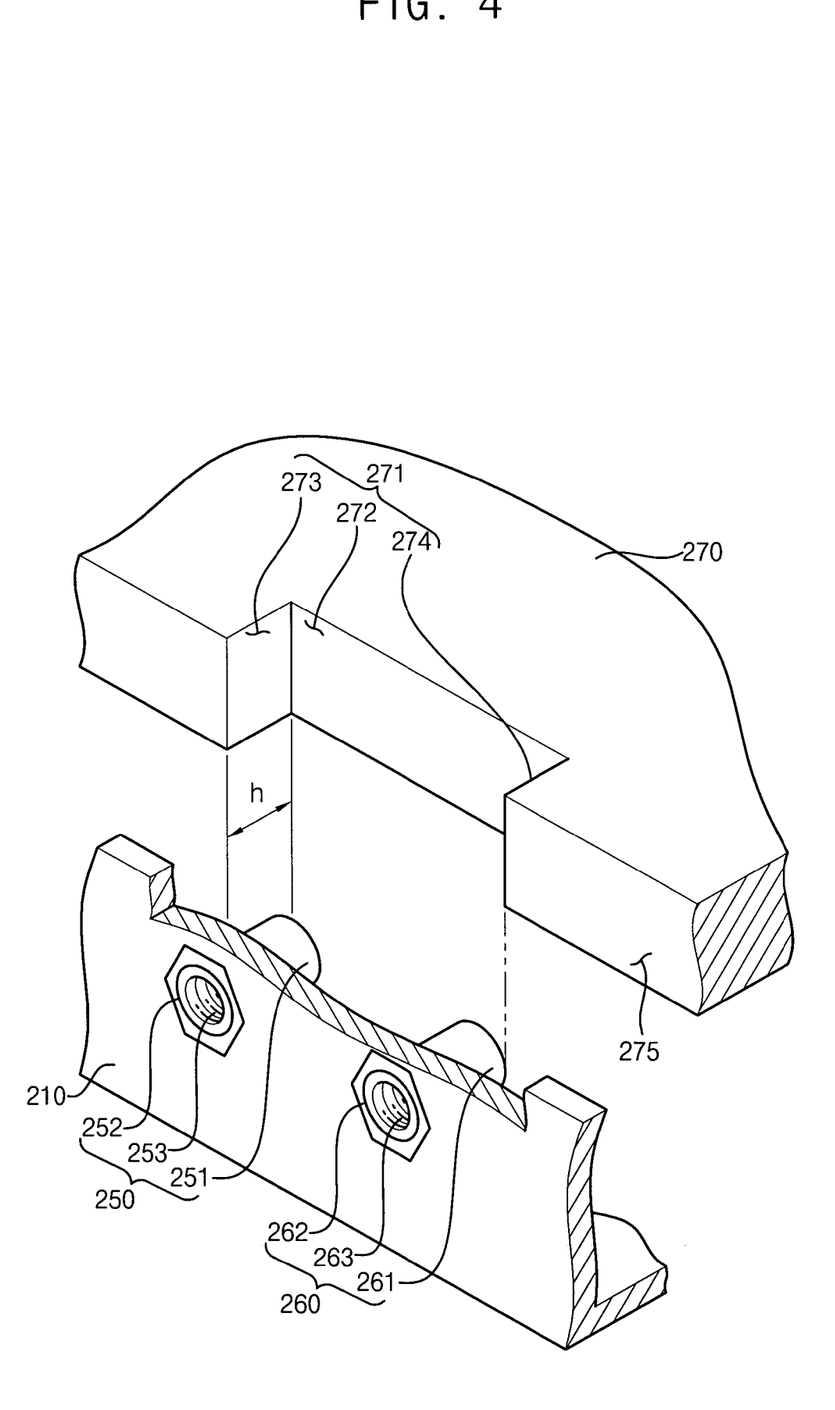
FIG. 4 is a perspective view illustrating a portion of the receiving container and a light guide plate in FIG. 1 according to another embodiment of the present invention.

Referring to FIG. 4, the receiving container may include a first coupling guide part 250 and a second coupling guide part 260, and light guide plate 270 including a guide recess 271 that corresponds to both the first and second coupling guide parts 250 and 260.

Guide recess 271 may be formed at a side face 275 of light guide plate 270 such that the guide recess 271 is adapted to receive both the first and second coupling guide parts 250 and 260. Guide recess 271 includes a first face 272 that is substantially parallel with the side face 275, and two second faces 273 and 274 connecting the first face 272 with the side face 275. Each of the second faces 273 and 274 has a width 'h'. Second face 273 makes contact with first coupling guide part 250, and second face 274 makes contact with second coupling guide part 260.

First coupling guide part 250 can be fixed at sidewall 210 of the receiving container. First coupling guide part 250, which includes inwardly protruding first stud 251 and first fixing end portion 252, is inserted into the guide recess 271. First stud 251 has, for example, a cylindrical shape of a height 'h' and includes a first screw thread 253. In other words, first stud 251 is substantially the same height as the width of the second face 273, and thus is substantially the same as a depth of guide recess 271.

Second coupling guide part 260 can be fixed at sidewall 210 of the receiving container. Second coupling guide part 260, which includes inwardly protruding second stud 261 and second fixing end portion 262, is inserted into the guide recess 271. Second stud 261 has, for example, a cylindrical shape of a height 'h' and includes a second screw thread 263. Like first stud 251, the height of second stud 261 is substantially the same as a depth of guide recess 271.

First and second studs 251 and 261 are inserted into guide recess 271. First stud 251 makes contact with second face 273, and second stud 261 makes contact with second face 274 to prevent drifting of light guide plate 270.

First and second coupling guide parts 250 and 260 guide the light guide plate 270 to a proper position. As previously described, a customer's external case may be easily coupled with the LCD module via first and second coupling guide parts 250 and 260.

Figure 5:
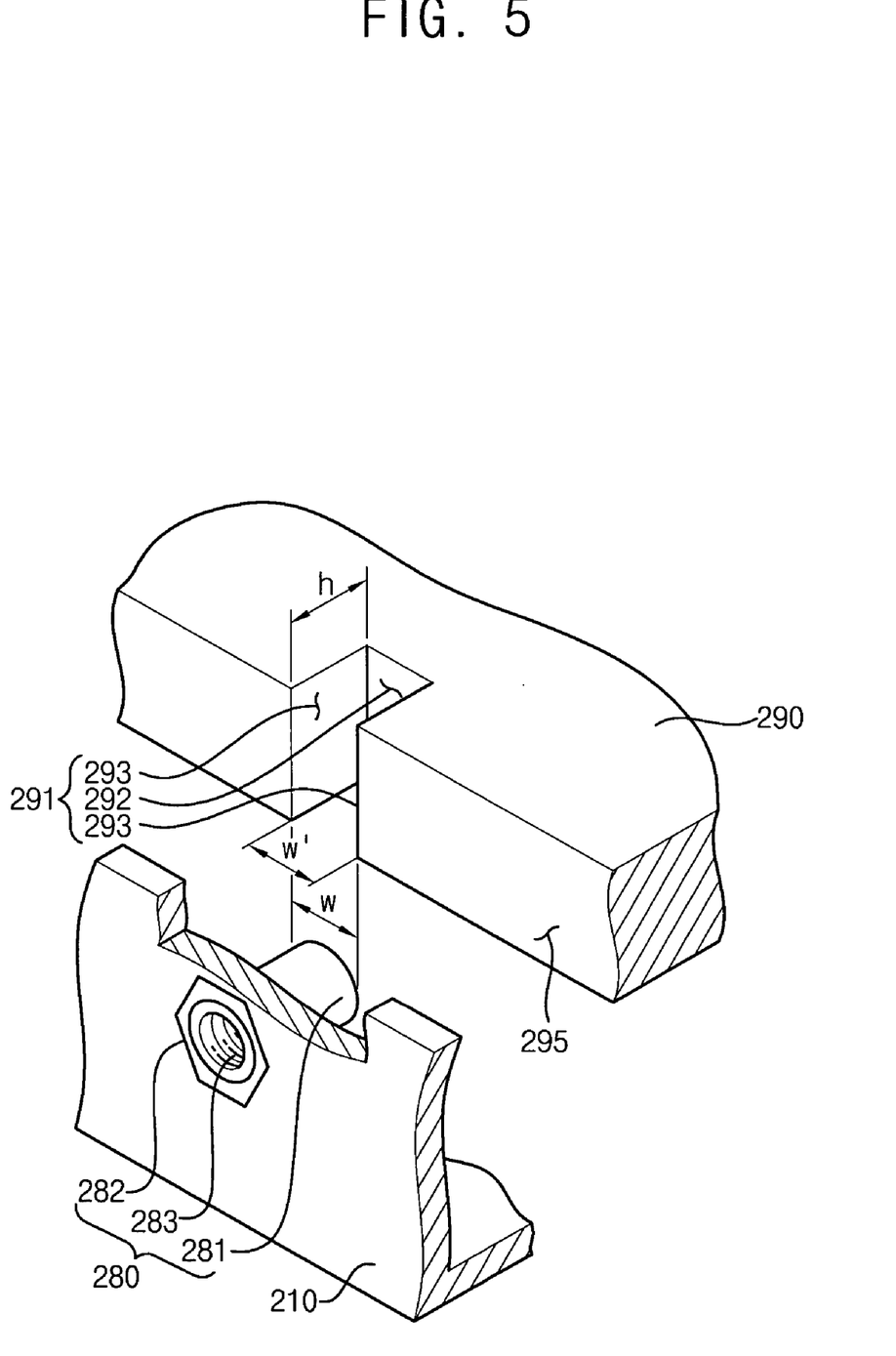
FIG. 5 is a perspective view illustrating a portion of the receiving container and a light guide plate in FIG. 1 according to yet another embodiment of the present invention.

Looking at FIG. 5, the receiving container may include coupling guide part 280, and light guide plate 290 including a guide recess 291 corresponding to the coupling guide part 280.

Coupling guide part 280, which also includes inwardly protruding stud 281 and fixing end portion 282, is inserted into guide recess 291. Stud 281 has, for example, a cylindrical shape of a height 'h' and a diameter 'w' and includes a screw thread 283 disposed on an inner surface thereof.

Guide recess 291 is formed at a side face 295 of light guide plate 290. Guide recess 291 has a first face 292 that is substantially parallel with side face 295 and two second faces 293 connecting first face 292 and side face 295. First face 292 has a width 'w'' that is substantially equal to or slightly smaller than the diameter 'w' of stud 281. Each of the second faces 293 has a width 'h' so that a depth of guide recess 241 is substantially the same as the height 'h' of the stud 231 of coupling guide part 280.

Therefore, when stud 281 is inserted into guide recess 291, drifting of the light guide plate 290 is prevented.

Such an arrangement of coupling guide part 280 allows customers to easily couple an external case with the LCD module.

Figure 6:
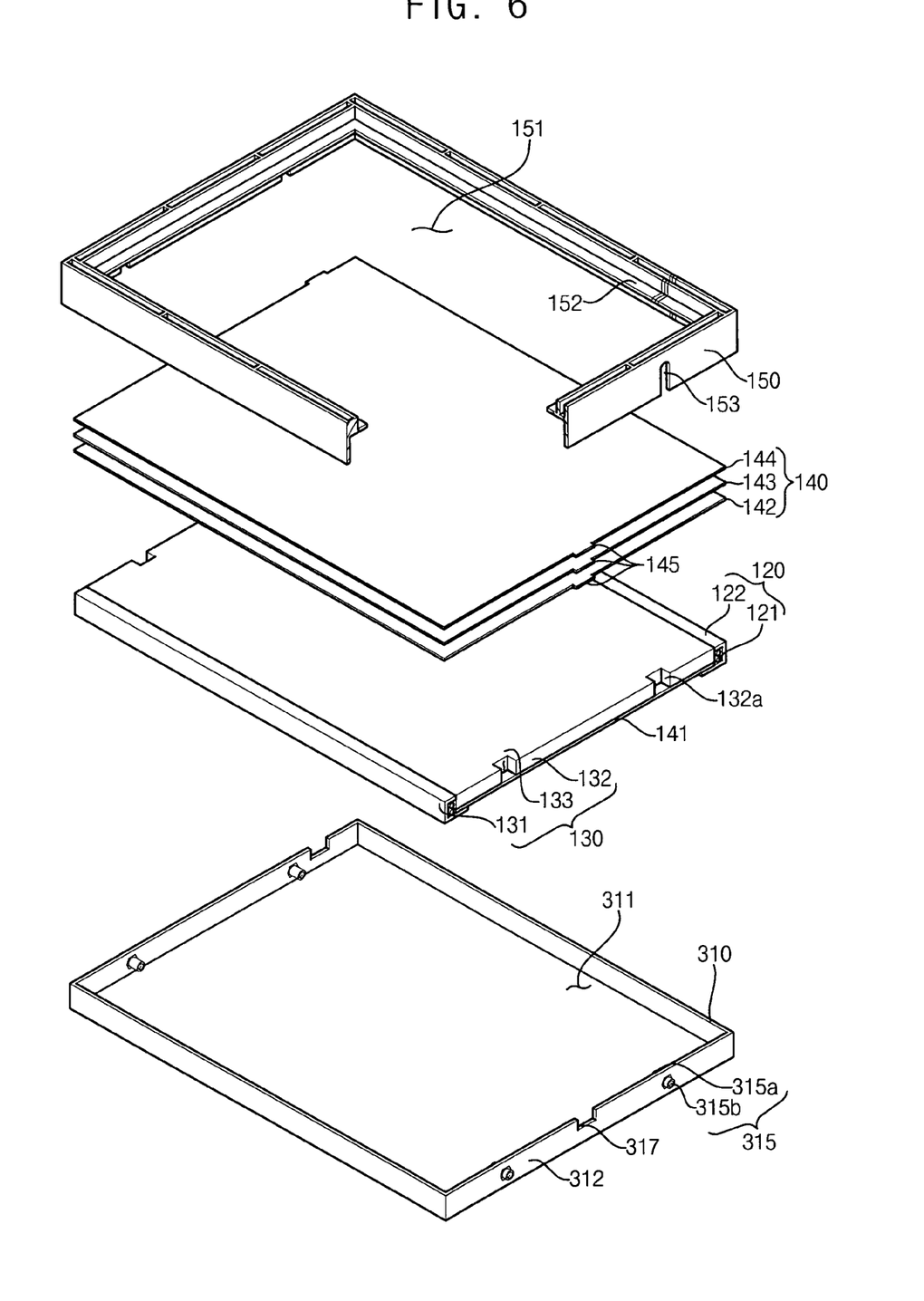
FIG. 6 is an exploded perspective view illustrating a backlight assembly according to another embodiment of the present invention.

Now looking at FIG. 6, a backlight assembly may include a receiving container 310, a lamp unit 120, a light guide plate 330 and a mold frame 150.

Receiving container 310 may include a bottom plate 311 and sidewalls 312 and be arranged similar to receiving container 110.

Here, coupling guide part 315 has an inwardly protruding first stud 315a and an outwardly protruding second stud 315b. First and second studs 315a and 315b both include a screw thread formed on inner surface, which allows coupling guide part 315 to be coupled with an external case by using a screw. Additionally, the coupling guide part 315 inwardly protrudes from the sidewalls 112 to operate as a guiding member. First stud 315a is inserted into a guide recess 331 formed at a side face 335 of light guide plate 330 to prevent drifting of the light guide plate 330. As noted above, coupling guide part 315 may have various shapes such as a circular tube shape or a polygonal tube shape for example, but here a circular tube shape is shown.

Fixing portion 317 receives a protruding portion 145 of optical members 142, 143 and 144 to prevent drifting thereof. Therefore, optical members 142, 143 and 144 are fixed in a correct direction and prevented from being disposed upside down in a similar manner as the previously described backlight assembly.

Lamp unit 120, the optical unit 140, and the mold frame 150 are similar to those illustrated in FIG. 1.

Figure 7:
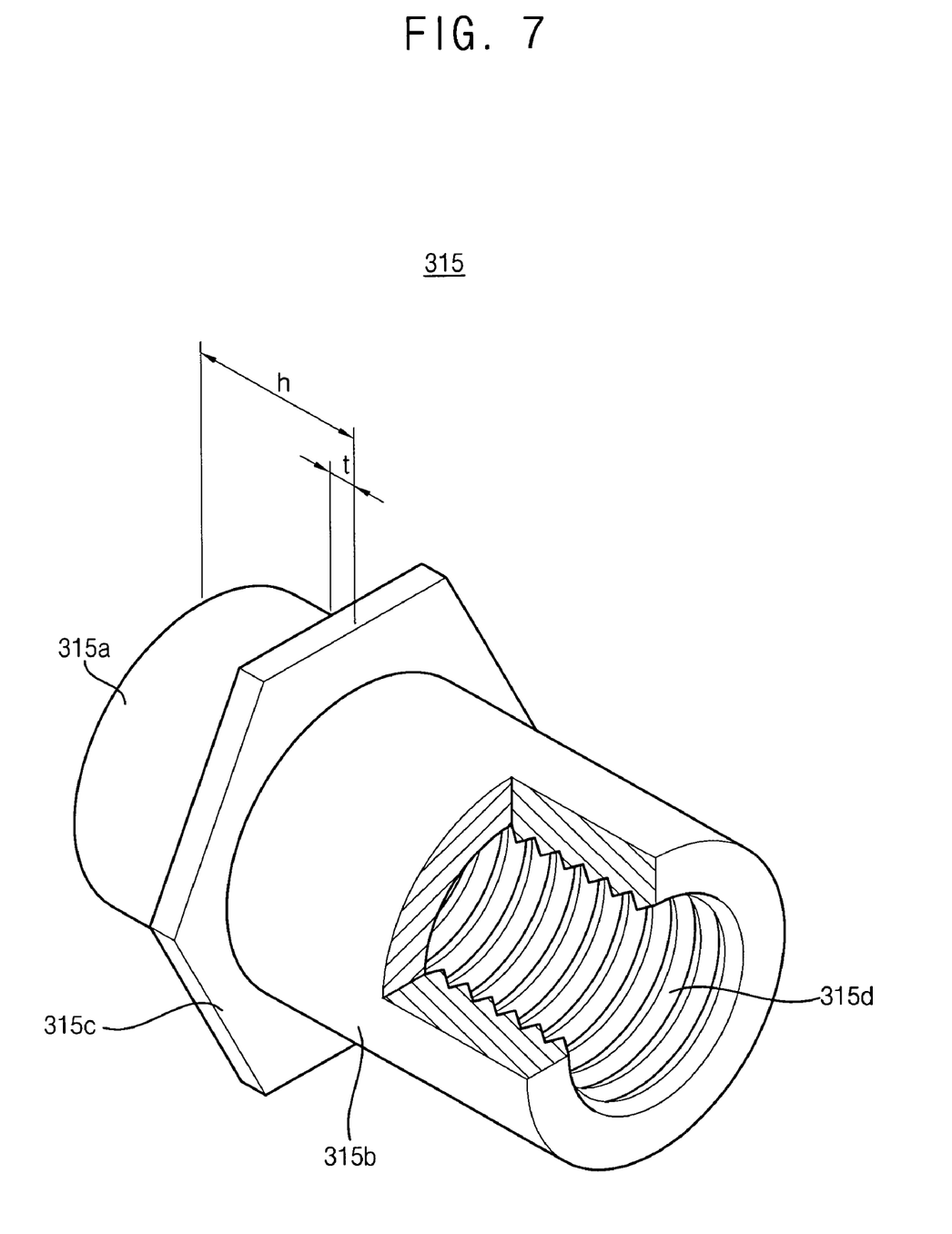
FIG. 7 is a partially cutout perspective view illustrating a coupling guide part in FIG. 6.

Referring to FIG. 7, first stud 315a has a height 'h' that is substantially the same as a depth of guide recess 331 formed at side face 335 of the light guide plate 330. First stud 315a is used as a guiding member that guides the light guide plate 330 to a proper position. The screw thread can be omitted from first stud 315a.

Second stud 315b includes a screw thread 315d formed at its inner face and can be used as a combining member.

Fixing end portion 315c can have a polygonal shape and is formed at a boundary of the first and second studs 315a and 315b. Fixing end portion 315c has a thickness 't' that is substantially the same as a thickness of the sidewall 312 and is fastened thereto. Fixing portion 315c is disposed such that the first stud 315a is disposed inside the receiving container 310 and the second stud 315b is disposed outside the receiving container 310.

Figure 8:
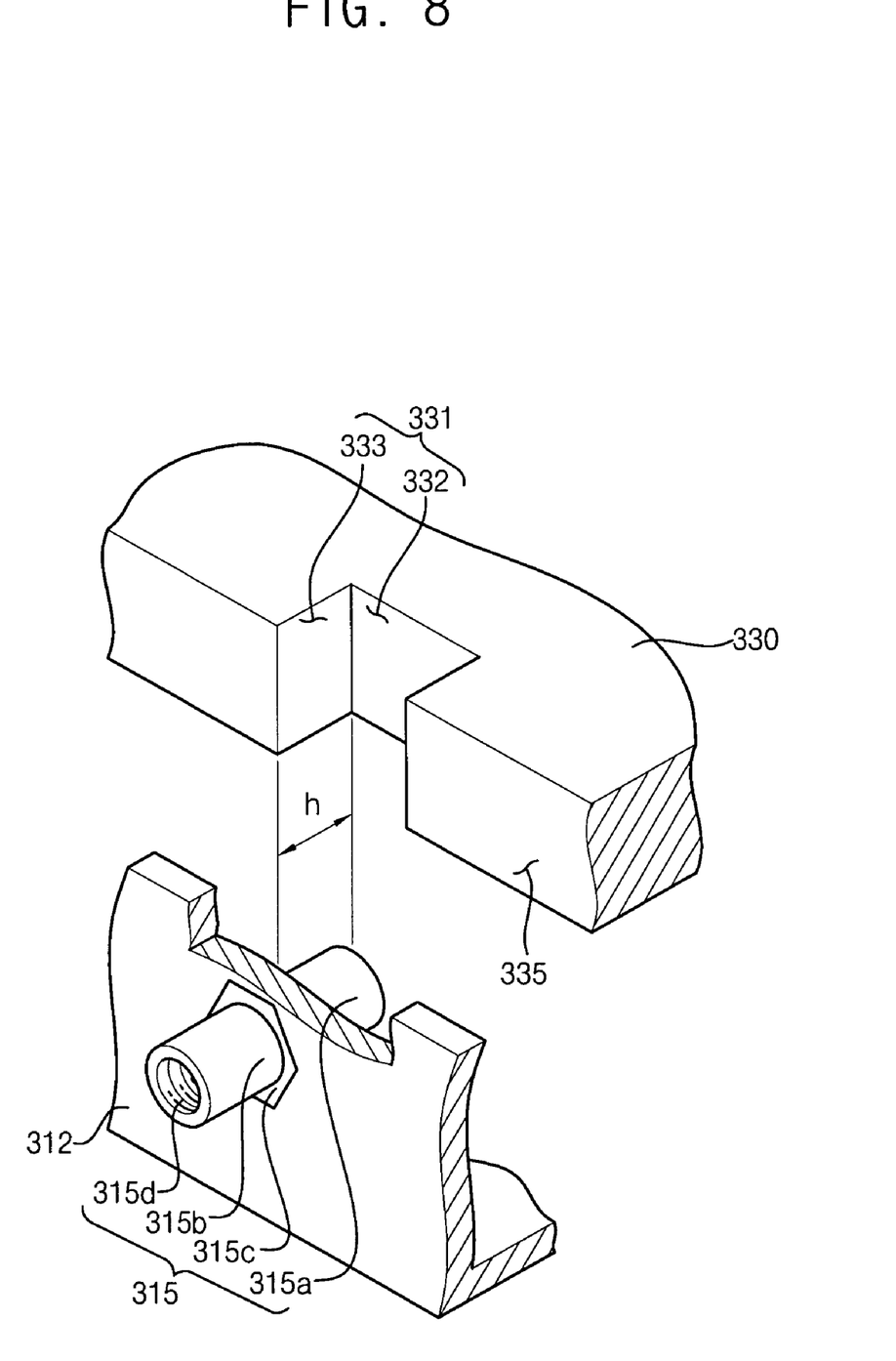
FIG. 8 is a perspective view illustrating a portion of the receiving container and a light guide plate in FIG. 6.

Referring to FIG. 8, coupling guide part 315 is disposed at a portion of sidewall 312 corresponding to guide recess 331 of light guide plate 330.

Guide recess 331 is formed at a side face 335 of light guide plate 330. Guide recess 331 is arranged similar to the guide recess of FIG. 3 and includes a first face 332, and two second faces 333 connecting the side face 335 with first face 332. Second face 333 has a width 'h' so that guide recess 331 has a depth that is substantially the same as a height of first stud 315a.

First stud 315a makes contact with at least one second face 333 when inserted into the guide recess 331, thus preventing drifting of light guide plate 330.

Figure 9:
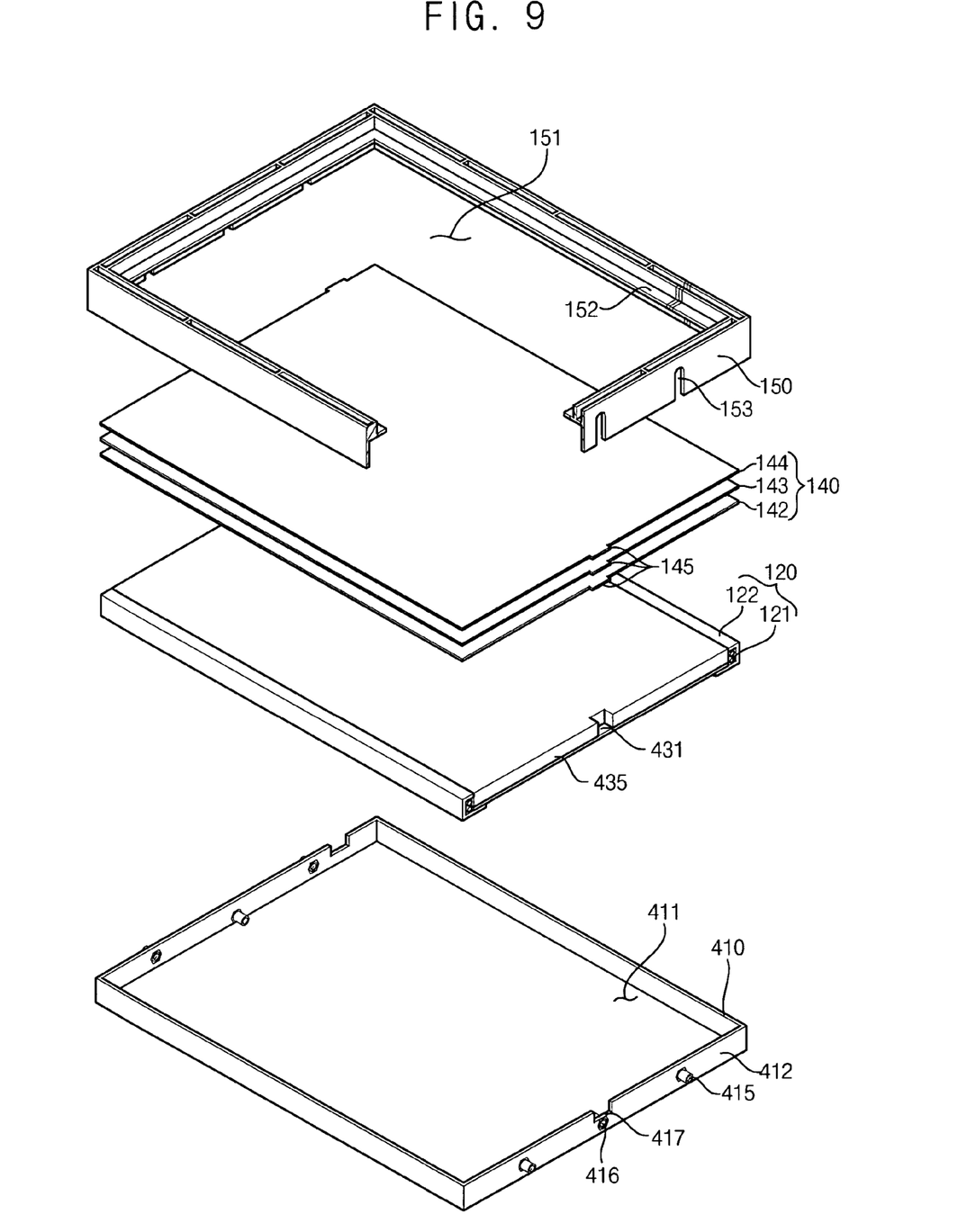
FIG. 9 is an exploded perspective view illustrating a backlight assembly according to yet another embodiment of the present invention.

Looking to FIG. 9, a backlight assembly similar to the one illustrated in FIG. 1 may include a receiving container 410, a lamp unit 120, a light guide plate 430 and a mold frame 150.

Receiving container 410 may include a bottom plate 411 and sidewalls 412. Sidewalls 412 include an outwardly protruding coupling portion 415, an inwardly protruding guide portion 416, and a fixing portion 417. Coupling portion 415 has a tube-shape and includes a screw thread disposed on its inner face. An external case (not shown) is coupled with receiving container 410 through coupling portion 415.

Guide portion 416 may also have a tube-shape and prevents drifting of the light guide plate 430 coupled to the receiving container 410.

The fixing portion 417 receives a protruding portion 145 of optical members 142, 143 and 144 to prevent drifting thereof. Fixing portions 417 are disposed in a similar manner or the fixing portions illustrated in FIG. 1, for example.

Lamp unit 120, optical unit 140, and mold frame 150 are also substantially similar to those illustrated in FIG. 1.

Looking at FIG. 9, coupling portion 415 and guide portion 416 are disposed at different positions of sidewall 412 of receiving container 410.

Coupling portion 415 includes first stud 415a and first fixing end portion 415b. First stud 415a can be a circular tube that includes a screw thread 415c disposed on its inner face. First fixing end portion 415b has a thickness 't' that is substantially the same as a thickness of sidewall 412.

Guide portion 416 includes a second stud 416a and the second fixing end portion 416b. Second stud 416a can be circular tube having a height 'h'. Second fixing end portion 416b can have a polygonal shape and a thickness 't' that is substantially same as a thickness of sidewall 412.

Figure 10:
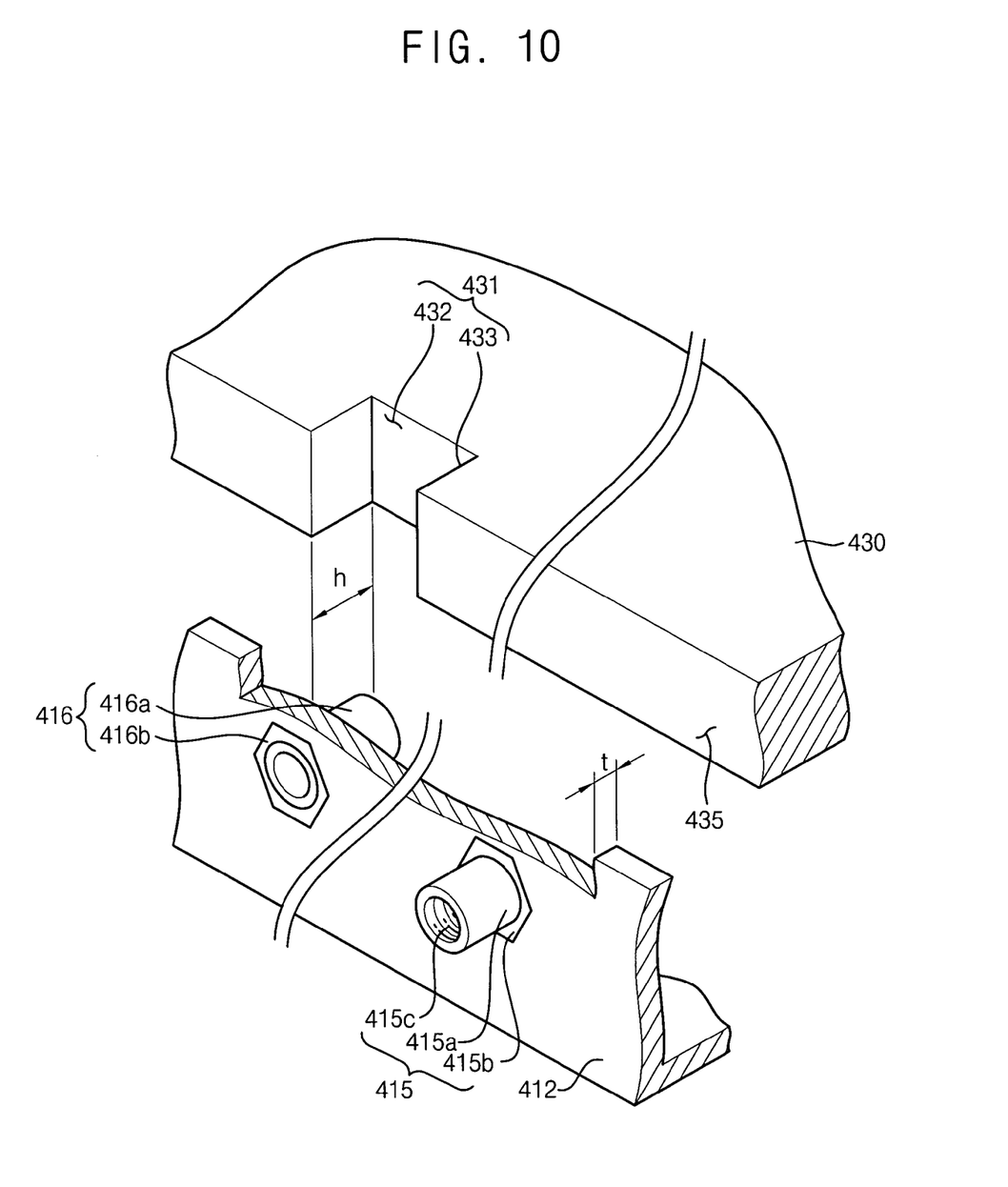
FIG. 10 is a perspective view illustrating a portion of the receiving container and a light guide plate in FIG. 9.

Referring to FIG. 10, guide recess 431 corresponding to the guide portion 416 is formed at a side face 435 of light guide plate 430. Guide recess 431 includes a first face 432 and two second faces 433 much like the previously described guide recesses. Each of the second faces 433 includes a width 'h' that is substantially the same as the height of second stud 416a to provide a guide recess 431 depth substantially the same as the height 'h' of second stud 416a.

When second stud 416a is inserted into guide recess 431, at least one of the second faces 433 of guide recess 431 makes contact with second stud 416a to prevent drifting of the light guide plate 430.

Figure 11:
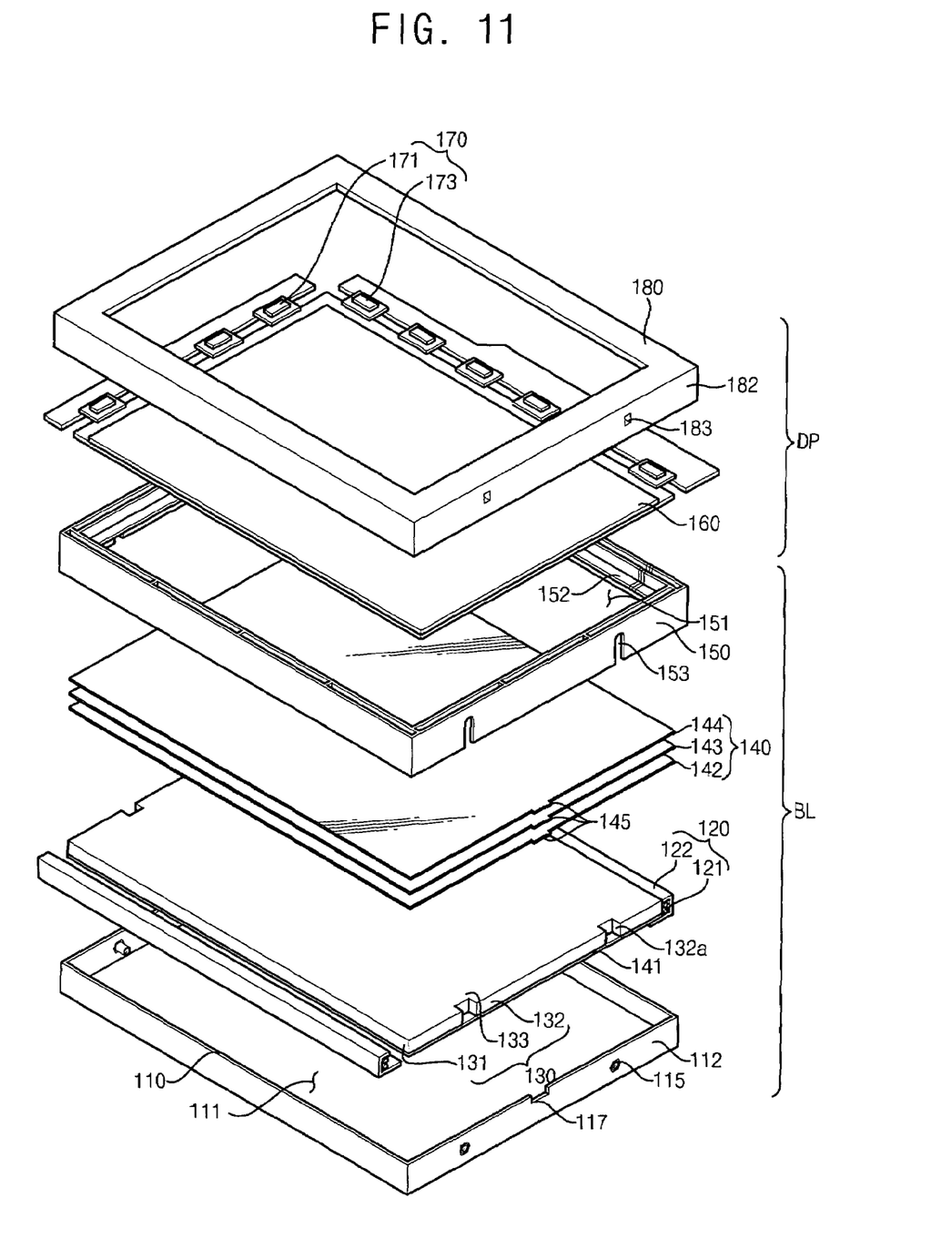
FIG. 11 is an exploded perspective view illustrating a liquid crystal display device according to an embodiment of the present invention.

Referring to FIG. 11, a display module includes a backlight assembly BL and a display assembly DP. The backlight assembly BL provides the display assembly DP with light, and the display assembly displays an image by using the light.

The backlight assembly BL may include a first receiving container 110, a lamp unit 120, a light guide plate 130, an optical unit 140 and a mold frame 150 similar to the backlight assembly illustrated in FIG. 1.

The display assembly DP may include a display panel 160, a driving circuit part 170, and a second receiving container 180.

Display panel 160 may include a first substrate, a second substrate and a liquid crystal layer disposed between the first and second substrates. Display panel 160 is disposed on supporting portion 152 of mold frame 150. Display panel 160 displays an image by using light generated from the backlight assembly BL.

Driving circuit part 170 may include a gate driving section 171 and a data driving section 173. Gate driving section 171 provides a plurality of gate lines formed on the first substrate, and data driving section 173 provides a plurality of data lines formed on the first substrate.

Second receiving container 180 can have a frame shape and includes a coupling hole 183 corresponding to coupling guide part 115. Coupling hole 183 is formed at sidewalls 182 of second receiving container 180, which is coupled with first receiving container 110 using a fastener, like a screw, inserted through coupling hole 183 and coupling guide part 115.

According to the present invention, the receiving container that receives the light guide plate includes the coupling guide part inwardly protruding with respect to the sidewalls of the receiving container. Therefore, the display assembly receiving container may be easily coupled with the backlight assembly receiving container as well as the external case due to the provision of a coupling guide part. Furthermore, the light guide plate may be fixed in a proper position using such arrangement.

Having described embodiments of the present invention and their advantages, it is noted that various changes, substitutions and alterations can be made herein without departing from the spirit and scope of the invention as defined by the appended claims.

What is claimed is:

1. A backlight assembly comprising:
   a light source;
   a light guide plate that adjusts a path of light from the light source;
   a receiving container receiving the light guide plate, the receiving container including a bottom plate and sidewalls upwardly extending from edge portions of the bottom plate; and
   a coupling guide part comprising:
      a first stud inwardly protruding with respect to the sidewalls of the receiving container;
      a second stud outwardly protruding with respect to the sidewalls of the receiving container; and
      a fixing end portion disposed at a boundary of the first stud and the second stud, the fixing end portion fixing the first stud and the second stud to the sidewall of the receiving container.

2. The backlight assembly of claim 1, wherein the second stud includes a screw thread disposed on an inner face of the second stud.

3. A backlight assembly comprising:
   a light source;
   a light guide plate that adjusts a path of light from the light source, the light guide plate including a guide recess;
   a receiving container that receives the light guide plate, the receiving container including a bottom plate and a sidewall upwardly extending from edge portions of the bottom plate;
   a coupling portion, the coupling portion comprising a first stud outwardly protruding with respect to the sidewall of the receiving container; and
   a guide portion guiding the light guide plate to the proper position, the guide portion comprising a second stud inwardly protruding with respect to the sidewall of the receiving container.

4. The backlight assembly of claim 3, wherein the first stud includes a screw thread disposed on an inner surface of the first stud and wherein the coupling portion further includes a first fixing end portion that fixes the first stud to the sidewall of the receiving container.

5. The backlight assembly of claim 4, wherein the guide portion further comprises a second fixing end portion that fixes the second stud to the sidewall of the receiving container.

* * * * *